United States Patent [19]
Murray

[11] 3,998,751
[45] Dec. 21, 1976

[54] SOLID OXIDIZING COMPOSITIONS

[76] Inventor: William Bruce Murray, 7100 Sea Wind Drive, Long Beach, Calif. 90803

[22] Filed: Oct. 21, 1974

[21] Appl. No.: 516,187

[52] U.S. Cl. ............................... 252/187 H; 8/111; 423/333; 423/341
[51] Int. Cl.² ........................................ C11D 7/54
[58] Field of Search ............... 252/187 H; 423/333, 423/341; 8/111

[56] References Cited
UNITED STATES PATENTS

| | | | |
|---|---|---|---|
| 3,640,876 | 2/1972 | Donaghu | 252/186 X |
| 3,656,890 | 4/1972 | Toy et al. | 252/187 H X |
| 3,843,548 | 10/1974 | James | 252/187 H |

OTHER PUBLICATIONS

Lewis, College Chemistry, Barnes & Noble Books, New York, 9th Ed., 1971, p. 190.

Primary Examiner—Leland A. Sebastian
Attorney, Agent, or Firm—Fulwider, Patton, Rieber, Lee & Utecht

[57] ABSTRACT

There is disclosed a method for the preparation of an oxidant-containing solid which is useful as an antiseptic agent, bleaching agent, oxidizing agent, etc. The solid, which can be prepared in a varied degree of water solubility, is prepared by reacting, in aqueous solution an alkali metal silicate with an oxidant which can be hydrogen peroxide or an alkali metal hypohalite. When a hypohalite is used as the oxidant, the resultant solid can be prepared in a varied degree of water solubility. Typically, a solution of sodium silicate is admixed with a solution of sodium hypochlorite, resulting in the formation of a voluminous, white precipitate that can be separated by filtration, decanting and the like, to obtain a solid containing the hypochlorite. The water solubility of this solid can be readily controlled by progressive dehydration of the solid, resulting in increasing water insolubility of the solid. By this method, it is possible to provide a range of hydrogen peroxide or hypohalite-containing solids, the latter having controllable degrees of water solubility, thereby providing a controlled release of oxidant for various treatments such as treatment of drinking water supplies, etc.

9 Claims, No Drawings

SOLID OXIDIZING COMPOSITIONS

BACKGROUND OF THE INVENTION

1. Field of the Invention

This invention relates to oxidant compositions and in particular, to hydrogen peroxide and hypohalite-containing solids and methods for their preparation.

2. Brief Statement of the Prior Art

Hydrogen peroxide and alkali metal hypohalites are commonly used inorganic oxidizing agents. Unfortunately, these chemicals are relatively unstable and must be stored and handled in dilute liquid solutions, hydrogen peroxide requiring stabilizing additives such as acetanilide and exclusion of alkalies while the hypohalites require alkaline solutions for stability.

The hypohalite ions, which can be formed by the reaction of a halogen with water, are very unstable and the hypohalous acids can not be recovered in the pure state. Even the alkali metal salts of these acids are unstable and the anhydrous salts are, in fact, explosive. This is unfortunate since these materials are excellent oxidizing agents, having strong oxidation potentials and, therefore, are of potential utility as antiseptics, disinfectants, bleaching agents and the like.

The hypohalite ion is stabilized in alkaline solutions, typically by dissolving a halogen in an aqueous base such as sodium hydroxide. While the presence of the base stabilizes the hypohalite ion in aqueous solutions, anhydrous salts obtained from the solution are unstable and, in fact, are explosive. Consequently, the use of hypohalites, heretofore, has been confined to the employment of aqueous solutions of the alkali metal hypohalites such as sodium hypochlorite.

Even the alkaline solutions of sodium hypochlorite are too unstable for some uses and the acute toxicity of this material limits its use to external applications such as the treatment of wounds or external skin diseases. The high water solubility of the alkali metal hypohalites also limits their utility as bleaching or oxidizing agents since these agents are immediately dissolved and dispersed through the treated aqueous liquid immediately following their addition and it is not possible to provide a reserve of the material that will be slowly released over an extended period of time.

BRIEF DESCRIPTION OF THE INVENTION

I have now prepared oxidant-containing solids of hydrogen peroxide and of hypohalites, the latter being obtained in controllable degrees of water solubility. The solids can be prepared by the reaction of an alkali metal silicate with the oxidant, hydrogen peroxide or an alkali metal hypohalite in aqueous solution. The reaction of these materials result in the formation of a voluminous white precipitate that can be readily separated from mother liquor used in its preparation by filtration, settling and decanting, etc. The separated solid can thereafter be dried to reduce its water content without any significant loss of oxidant, i.e., hydrogen peroxide or hypohalite. The drying of the hypohalite-containing solids decreases their water solubility, thereby providing hypohalite-containing solids of controlled and varied water solubility.

DESCRIPTION OF PREFERRED EMBODIMENTS

The invention comprises oxidant-containing solids and methods for their preparation. The solids can contain hydrogen peroxide or hypohalites, the latter having controlled water solubility. The solids are obtained by the reaction of a water-soluble, alkali metal silicate with the oxidant, hydrogen peroxide or an alkali metal hypohalite. The reaction initiates, at ambient temperatures, upon the admixture of the reactants and forms a voluminous white precipitate that can be readily settled and separated from its mother liquor.

The silicate employed in the reaction can be any available alkali metal silicate, e.g., sodium silicate, potassium silicate, lithium silicate, cesium silicate, etc. The most widely available and least expensive silicate is, of course, sodium silicate, and this constitutes the preferred silicate reactant for use in the invention. The silicates can be obtained in liquid solution with a variety of relative amounts of the alkali metal oxide, typically ranging from 2/1 to about 1/4 molar parts alkali metal oxide per molar part of silica. The most readily available commercial product, sodium silicate is obtained by the fusing of soda ash and silica sand at temperatures of about 1200° to about 1500° C. to obtain a solid that can be subsequently dissolved with steam to provide an aqueous solution of sodium silicate having a composition ranging from ortho silicate (two molar parts sodium oxide per part of silica), metasilicate (equal molar parts) to compositions containing about four parts silica per molar part of sodium oxide. These solutions are commercially available with solids contents ranging from about 20 to about 60 weight percent, typically from 35 to about 55 weight percent.

The reaction of this invention is not particularly sensitive to the concentration of the sodium silicate in the aqueous liquid or to the relative amounts of the alkali metal oxide and silica. Since the reaction forms a solid precipitate which is separated from the mother liquor obtained in its manufacture, the commercially available solutions of the alkaline metal silicate can be used directly without unnecessary dilution or concentration. If desired, for any reason, alkali metal silicate solutions of higher and lower concentrations, e.g., from 1 to about 75 weight percent solids can be employed in the reaction.

The solution of hydrogen peroxide employed in the reaction can be an aqueous solution of varied concentration since the reaction does not depend on any particular concentration of this reagent. Accordingly, hydrogen peroxide solutions at any available concentration, e.g., from about 3 to 90 weight percent, can be used. Commercially available concentrations of hydrogen peroxide are 3 weight percent and from 30 to about 40 weight percent and these concentrations are preferred for their availability.

The solution of the alkali metal hypohalite employed in the reaction can be of any of the halogens of bromine, iodine, or chlorine, since these halogens all readily form stable hypohalite solutions at alkaline pH values. The alkali metal of these solutions, again, can be any available alkali metal such as sodium, lithium, potassium or cesium, although for reasons of economy the more plentiful and less expensive sodium is preferred. The hypochlorite solutions are stable at alkaline pH values and, accordingly, the solutions are employed with a slight excess of base, e.g., sodium hydroxide. Typically, these solutions are prepared by the introduction of the halogen into an aqueous solution of the alkali metal hydroxide such as the introduction of chlorine into a sodium hydroxide solution. The solutions of sodium hypochlorite are also commercially available at concentrations of about 12–15 weight percent sodium hypochlorite present in excess sodium hydroxide, sufficient to provide a pH value to the solution from about 10 to 13.

The alkali metal hypohalite solutions can be employed directly as a reactant in the invention or, if desired, the solutions can be prepared in situ by the addition of an aqueous solution of the alkali metal hydroxide to the alkali metal silicate solution and introduction of the halogen to the resultant mixture to form the hypohalite solution and precipitate the hypohalite-containing solid of the invention.

The concentration of the hypohalite solution employed in the reaction is not particularly critical to the reaction and solutions of commercially available concentrations are, therefore, preferred. Typically, the solutions can be employed in concentrations from 1 to about 20 weight percent of the alkali metal hypohalite, preferably from 10 to about 15 weight percent.

The reaction can be performed at ambient conditions of temperature and pressure although temperatures from 0° to about 50° C. can be employed. Similarly, superatmospheric pressures, particularly at the more elevated temperatures, can be employed to avoid loss of the halogen from the compositions. Preferably, however, the reaction is performed at ambient temperatures, e.g., from 20° to about 25° C. and at atmospheric pressure.

The admixture of the alkali metal silicate with the alkali metal hypohalite forms a voluminous white precipitate that can be separated from the solution by any suitable means, e.g., by permitting the precipitate to settle and decanting or filtering the clarified liquid from the resultant solid.

The nature of the chemical reaction and the chemical composition and identity of the solid precipitates are not known with certainty. The hypohalite-containing solid could be an addition product of the alkali metal silicate and alkali metal hypohalite or the hypohalite anions could be directly bonded to the silicate structure. An addition compound is represented by the emperical formula:

$$a\ Na_2O.b\ SiO_2.yMOX.zH_2O$$

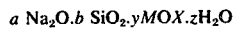

wherein:
 $M$ is an alkali metal;
 $X$ is chloride, bromide or iodide;
 $a$ is 1 to 2;
 $b$ is 1 to 4; and
 $y$ and $z$ represent varied molar proportions of hypohalite and water of hydration in the solid.

Regardless of the mechanism and exact chemical composition, I have found that the resultant solid contains the hypohalite, e.g., hypoclorite, and is useful as a source of oxidizing agent for applications as an antiseptic, disenfectant, bleaching agent and the like.

The water solubility of the hypohalite solid can be readily controlled by drying of the solid to varied stages of dehydration since the solid has progressively decreasing water solubility with increasing stages of dehydration. The dehydration of hydrogen peroxide and hypohalite-containing solids can be performed by heating the solid to temperatures from ambient to about 300° F., preferably from 200° to about 250° F. This heating can be performed at atmospheric or subatmospheric pressures, the latter being useful to facilitate dehydration. Accordingly, pressures from about 0.1 to about 1 atmosphere can be employed to dry the solid. The solid can be held at the preselected drying temperature for a sufficient time to achieve an equilibrated state of dehydration, typically for a period of time from 15 minutes to about 12 hours. Surprisingly, it has been observed that the dehydration of the solids in the aforedescribed manner does not result in any substantial decomposition of the hypohalite-containing solid or in loss of oxidation capability of the hydrogen peroxide containing solid.

The invention will now be described with reference to the following examples which will illustrate a mode of practice of the invention and demonstrate results obtainable thereby.

EXAMPLE 1

A series of experiments were performed in which 50 milliliters of sodium silicate having a silica to sodium oxide molar ratio of 3.22 and a solids content of 38.3 weight percent were admixed with progressive increments of 25, 50, 100 and 150 milliliters of a 12.5 weight percent sodium hypochlorite solution. The experiments were performed at ambient temperature and pressure and there was observed the formation of a voluminous white precipitate in each of the experiments immediately upon the addition of the sodium hypochlorite solution. The volume of solid formed constituted substantially the entire reactants in the first experiment with little or no liquid being separated from the solid. In each of the other experiments, the volume of supernatant liquid separated from the solids progressively increased with the increasing amounts of the sodium hypochlorite solution that were employed.

EXAMPLE 2

The solid hypohalite precipitate was prepared by admixing 250 milliliters of the sodium silicate solution described in the preceding example with 45 milliliters of a 1 Normal sodium hydroxide solution. The resultant mixture, which was a clear liquid free of precipitates, was then contacted with chlorine by bubbling chlorine gas into the liquid. Immediately upon introduction of the chlorine, the characteristic white voluminous precipitate of the invention was formed.

EXAMPLE 3

Aqueous solutions of sodium hypoiodite and hypobromite were prepared by the additions of sodium iodide and sodium bromide to separate portions of a commercially available, 12.5 weight percent sodium hypochlorite solution. The resultant solutions of sodium hypoiodide and sodium hypobromite were then employed in reaction with the aforedescribed commercial sodium silicate solution by the addition of incremental amounts of these solutions to aliquot portions of the sodium silicate solution, resulting in the formation of silicate precipitates containing the hypoiodite and hypobromite.

EXAMPLE 4

The solid precipitate formed by the reaction of sodium silicate and sodium hypochlorite was separated from its mother liquor and dehydrated in a progressive manner by heating for varied lengths of time at 250° F. and atmospheric pressure. The white precipitate initially formed gradually changed to an elastic soft and transparent glassy melt after 12 hours of heating. Samples of the material before and after selected periods of heating were tested for water solubility by adding each sample to 100 milliliters distilled water and stirring for one hour at room temperature to obtain the following data:

| Time at 250° F. | Grams/100 grams water |
|---|---|
| 0 | instantly soluble |
| 0.5 hours | 10 grams |
| 2 " | 6.05 grams |
| 4 " | 2.12 grams |
| 8 " | 0.45 grams |
| 12 " | insoluble |

The solutions prepared in each solubility test, except that containing the insoluble solid, released a detectible odor of chlorine.

EXAMPLE 5

A solution of the sodium silicate solution described in Example 1 was contacted with hydrogen peroxide by stirring a 30 weight percent aqueous solution of hydrogen peroxide slowly into the silicate solution. A fine, white crystalline precipitate formed and the hydrogen peroxide was added to excess to obtain substantially complete precipitation of the solid. The solid was separated from the solution and was heated to and maintained at 250° F. for 12 hours. After heating, the solid was still rapidly soluble in water and its solutions exhibited strong oxidation properties.

The invention has been described with reference to the presently preferred and illustrated mode of practice. It is not intended that the invention be unduly limited by the preceding description. Instead it is intended that the invention be defined by the reagents and steps, and their obvious equivalents, set forth in the following claims.

What is claimed is:

1. A method for the preparation of an oxidant-containing solid consisting essentially of the reaction product of an alkali metal silicate and an oxidant which comprises contacting, in aqueous liquid phase, an alkali metal silicate having an alkali metal to silica molar ratio from about 2/1 to about 1/5 with an oxidant selected from the group consisting of alkali metal hypochlorites, hypobromites, hypoiodites and mixtures thereof at a maximum weight ratio of no greater than about 0.72 parts oxidant per part of silicate to precipitate said solid and separating said solid from said aqueous liquid phase.

2. The method of claim 1 wherein said alkali metal is sodium.

3. The method of claim 2 wherein said oxidant is an alkali metal hypohalite.

4. The method of claim 3 wherein said hypohalite is hypochlorite.

5. The method of claim 3 which comprises the steps of addition of an alkali metal hydroxide and a halogen to said aqueous liquid phase.

6. The method of claim 3 including the steps of settling the precipitate formed by the reaction and decanting the mother liquid to recover a hypohalite-containing solid.

7. The method of claim 6 including the step of drying the separated solid to effect its dehydration and impart water insolubility thereto.

8. The method of claim 4 wherein said sodium hypochlorite is an aqueous solution of from 10 to about 15 weight percent sodium hypochlorite.

9. The product produced by the method of claim 1.

* * * * *